July 26, 1949.
N. O. BRODERSON ET AL
2,477,170
PROCESS AND APPARATUS FOR MAKING
VARIEGATED PLASTIC ARTICLES
Filed Aug. 12, 1946
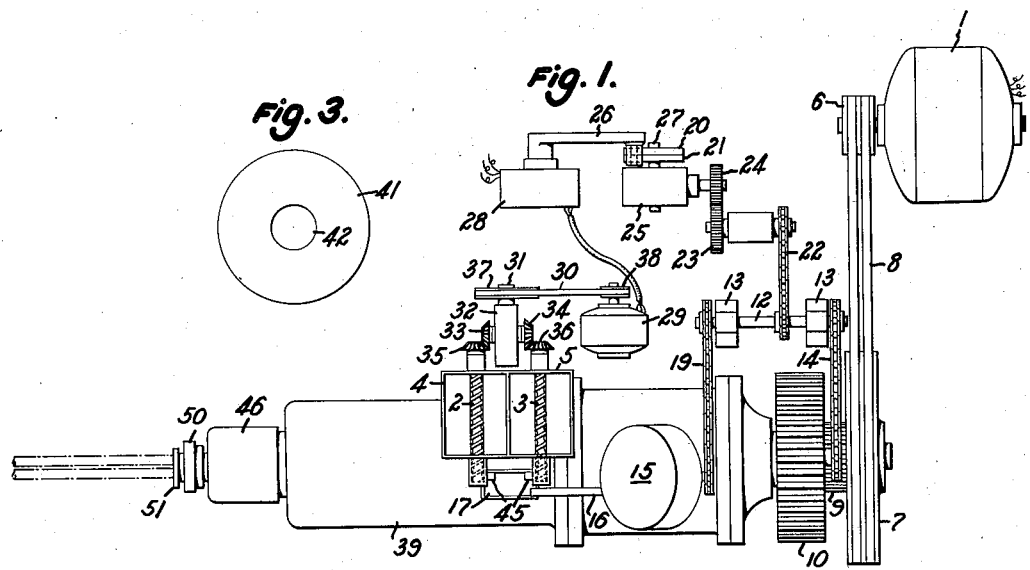
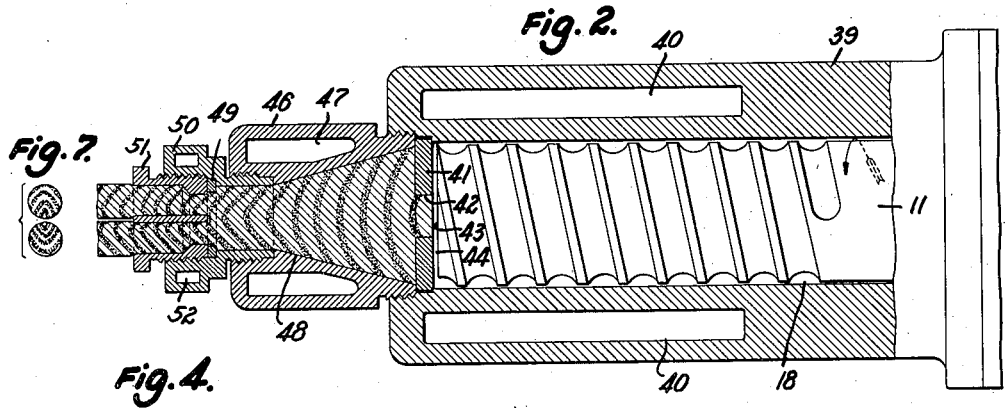
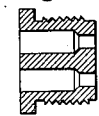
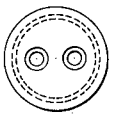
Inventors:
Neil O. Broderson
Edwin C. Broderson
By Stowell & Evans
Attorneys.

Patented July 26, 1949

2,477,170

UNITED STATES PATENT OFFICE 2,477,170

PROCESS AND APPARATUS FOR MAKING VARIEGATED PLASTIC ARTICLES

Neil O. Broderson, Rochester, and Edwin C. Broderson, Akron, N. Y., assignors to Rochester Button Company, Rochester, N. Y., a corporation of New York Application August 12, 1946, Serial No. 689,989

7 Claims. (Cl. 18—13)

This invention relates to the manufacture of buttons and the like, and particularly to an apparatus and a process for making variegated rods of plastic material suitable for the production of mottled buttons simulating the attractive grained appearance of buttons cut from natural horn, shell and the like.

An object of this invention is to provide a process for making extruded rods of plastic substance having a varicolored grain such that buttons produced by cutting the rod will exhibit the aforesaid natural grained appearance.

Another object of the invention is to provide a machine or apparatus for the production of rod-like stock from which buttons may be made.

Another object of the invention is to provide a process of making button stock or the like having a grained structure in which the bleeding of color from one component of the stock to another is avoided, whereby to produce a button stock of enhanced decorative appearance having a distinct and clear-cut grain.

Other objects and advantages of this invention will appear in the following description in which the production of variegated rods and buttons from plastic compositions comprising casein is more particularly referred to by way of example.

Apparatus for making variegated extruded articles in accordance with the invention may include means defining a longitudinally extended conduit for the advancement of a stream of plastic material, means for introducing into said conduit a succession of different colored portions of plastic material extending substantially transversely across said conduit, means for forcing said plastic material along said conduit, means for splitting the advancing stream of plastic material substantially along its longitudinal axis into a plurality of portions, and means for extruding said portions into separate articles.

Moreover, the apparatus may include means associated with the above-described machine for alternately feeding plastic material of one color and plastic material of another color to the machine for making the variegated or mottled rods. The over-all rate of feeding plastic material to the machine may be adjusted as required independently of other adjustments. The ratio of different colored plastic materials fed may be adjusted to any desired value without changing the over-all feed rate. The frequency of alternation of feeding the two colors may be varied within wide limits also, without regard for or without altering the over-all feed rate.

Further associated with the machine is means for feeding thereto, together with granular plastic material, preformed pellets of clear or colored plastic material whereby further useful variations in the grain pattern of the product of the invention may be obtained. The rate of feeding the pellets may be adjusted within wide limits as required by the particular effect desired.

The invention also includes the process of making variegated articles which comprises masticating successive discontinuous portions of differently colored plastic material, forcing said masticated portions into a continuously advancing stream comprising successive different colored portions extending transversely across substantially the entire stream, splitting said advancing stream substantially along the longitudinal axis thereof into a plurality of portions, and extruding said portions into separate articles.

In working with plastic compositions containing moisture, such as casein plastic compositions, the distinctness and clarity of the grain of the product is enhanced if the process is further supplemented by adjusting the moisture content of the casein used so that bleeding of color from one component to the other is avoided. We have found that if the moisture content of the casein in the mix from which it is desired that the color shall not bleed is kept lower than the moisture content of the rest of the casein, bleeding will not occur, or at most, only slight bleeding will result.

We have also discovered that more distinct mottling is obtained if, in addition to, or independently of, the adjustment of moisture content, at least one of the portions of casein which are alternately fed to the machine previously has been worked, for example, by subjecting it separately to conditions of heat, pressure and flow to produce a compacted casein body which is then comminuted as by grinding.

An iridescent or nacreous effect, simulating the effect of natural pearl, may be obtained by incorporating with casein flaked aluminum, or like highly reflecting foliaceous powdered substances, and alternately feeding the mixture with plain or colored casein or with casein compositions containing smaller proportions of aluminum to the apparatus of this invention. A variegated rod of button stock is produced to which one of the components lends iridescence and the other of the components contributes body. This rod may be turned by suitable conventional machining into buttons or the like which have a pleasing pearly aspect.

The invention will be more particularly described with reference to the accompanying drawing in which:

Fig. 1 is a plan view of one form of an extruding machine embodying the principles of the invention;

Fig. 2 is an enlarged view, partly in section, of the masticating chamber and extruding head of the apparatus showing the screw in perspective;

Fig. 3 is an end view of a bridge plate;

Fig. 4 is an end view of the extruding head of the apparatus shown in Fig. 2;

Figs. 5 and 6 are medial sectional and end views respectively of an alternative form of extruding head; and Fig. 7 is a cross-sectional view of a matched pair of extruded rods produced by the apparatus of Fig. 2.

In Fig. 1, main driving motor 1 drives all the moving parts of the machine except feed screws 2 and 3 in the feed hoppers 4 and 5. Motor 1 turns sheave 6 which drives sheave 7 through belts 8. Pinion 9, mounted on the same shaft with sheave 7 is rotated therewith, and it meshes with the large gear 10 which drives the main shaft of the masticating and extruding device. This main shaft is connected directly with extruding screw 11 and turns the same in the direction indicated by the arrow in Fig. 2.

Counter-shaft 12, mounted in bearings 13, is rotated by the main shaft of the extruding device through sprocket chain 14 engaging suitable sprocket wheels mounted on the counter-shaft and the main shaft of the extruding device. Counter-shaft 12, in turn, serves to drive preform pellet feeding device 15 of conventional design which feeds preformed pellets of colored or clear casein down chute 16 into the mouth 17 of the screw or masticating chamber 18. The driving of the preform feeding device is accomplished by means of sprocket chain 19 and suitable sprocket gears secured to the counter-shaft and the drive shaft of the pellet feeding device. The rate of feeding pellets to the converting chamber may be varied by changing the ratio of the sprocket gears associated with sprocket chain 19.

The counter-shaft 12 also serves to drive adjustable cams 20 and 21 through the train including sprocket chain 22, spur gears 23 and 24 and reduction gear 25. Each of the cams 20 and 21 has an approximately semicircular rise corresponding to the raised position of lever 26, and an approximately semicircular depressed surface corresponding to the lowered position of lever 26. Cam 21 is fixed to the low-speed shaft 27 of the reduction gear, while cam 20 may be angularly rotated and secured with respect to cam 21. By proper adjustment of the cams the lever 26 may be held in raised position for from one-half to one full revolution of shaft 27.

Lever 26 actuates a reversing switch 28 controlling feeding motor 29. When the lever 26 is in raised position, the motor runs in one direction; when it is in lowered position the motor runs in the opposite direction; and when the lever is in intermediate position the motor does not operate.

Motor 29 drives feed screws 2 and 3 through the train including belt 30, which rotates the high speed shaft 31 of reduction gear 32, bevel gears 33 and 34, mounted on the low-speed shaft of the reduction gear, and bevel gears 35 and 36 operatively engaging bevel gears 33 and 34, respectively. Feed screws 2 and 3 are of the same hand but rotate in opposite directions simultaneously, so that while one is feeding material from its hopper the other is tending to withdraw material from around the discharge opening of its hopper. Upon reversal of the motor, there is a slight delay between the time when material ceases to be fed from one hopper and begins to be fed from the other due to the time required for the material which has been backed up in the latter hopper to reach the discharge opening 45 thereof. There is a still further short hiatus or dwell occasioned by the reversing switch 28 passing through its neutral position causing the motor to stop. This dwell between alternations is important, as will be explained hereinafter, in connection with the process phase of the invention.

By adjusting cams 20 and 21 and by choosing between hoppers 4 and 5, any desired ratio of two granular materials may be fed to the extruding machine. The ratio of materials fed thus may be varied independently of the over-all time rate of feed, since the over-all time rate of feed is dependent primarily upon the speed of the reduction gear 32.

The frequency of alternation of feeding the material may be varied by changing spur gears 23 and 24 to give the desired speed to cams 20 and 21. Likewise, this change may be effected independently of the over-all time rate of feed.

The over-all time rate of feed may be varied by changing the speed of motor 29, as by employing a rheostat, not shown, in the power line to the motor. Or the rate of feed may be determined by the relative size of sheaves 37 and 38.

Referring to Fig. 2, 18 represents the screw or masticating chamber of the machine. The walls 39 of the chamber are provided with cooling jackets 40. Bridge plate 41, an enlarged end view of which is shown in Fig. 3, forms the discharge end of the screw chamber. Orifice 42 is concentric with the axis of screw 11. The orifice has a considerably smaller diameter than the end 43 of screw 11. Bridge plate 41 cooperates with the end 43 of the screw to provide a constricted centrally converging passage 44. The general shape of this chamber may be varied somewhat from the cylindrical shape as shown to some other convenient form.

Converting head 46 is provided with heat control jacket 47. The converting chamber 48 here has the form of a truncated cone with its minor base surmounted by a cylinder. A function of this chamber is to provide a space of decreasing cross section in the direction of flow of the material being worked whereby the body of material as a whole is somewhat elongated in its passage therethrough. At the small end of the converting chamber there is located a gasket or washer 49.

Collar 50 is screwed onto the converting head at its discharge end and receives the washer 49 and the extruding nozzle 51. The collar is jacketed at 52. The nozzle shown in Fig. 2 is provided with two orifices, and appears in end view in Fig. 4. The nozzle illustrated in Figs. 5 and 6 may be substituted for that shown in Fig. 2.

In describing the exemplary operation of the apparatus for the production of variegated rods of two colors, the description of the function of the pellet feeding device 15 will be deferred, since the feeding of pellets is an optional procedure. A granular plastic substance capable of being extruded is charged into the hoppers 2 and 3. The color of the substance in each of the hoppers is different. For example, casein colored black with a suitable dye or pigment may be placed in hopper 2 and white or clear casein may be placed in hopper 3. The cam 20 is set with respect to cam 21 so that the proportion of white and black desired in the resulting product is fed alternately from the respective hoppers. The frequency of feed alternations is adjusted by selecting the proper gear ratio between gears 23 and 24 to give the desired grain structure in the resultant product. The over-all feed rate is set, as explained hereinbefore, so that the machine will accept all the material fed without allowing this material to back up into the mouth 17 of the screw chamber or to proceed so far down the chamber that poor consolidation and mastication is effected. The feeding of such extrusion apparatus requires the supervision of an operator who may make slight adjustments in the over-all feed rate as occasion demands in order to maintain the proper amount of material in the screw chamber.

With both the main driving motor 1 and the feeding motor 29 running, alternate portions of white and black casein are transferred from the hoppers 2 and 3 into the masticating chamber 18. Between successive additions of portions of casein there is a short dwell, and this short space of time permits one portion of granular casein to advance sufficiently far forward that it will not become excessively mixed with the succeeding portion before it is compacted.

The successive portions of differently colored plastics are masticated in chamber 18 and forced into a continuously advancing stream of masticated material. The successive portions form a series of varicolored sections transversely of the stream which in the advance of the stream, because of the greater retardation of the peripheral portions thereof, are drawn out longitudinally into conical sections having their apices substantially centrally located in the stream, as shown in Fig. 2. By splitting the stream diametrically and separately extruding the diametrically opposed portions of the stream by means of extruding nozzles of the type shown at 51 in Fig. 2 and in Figs. 5 and 6, the extruded portions are given a grained appearance simulating natural horn, shell and the like. The transverse sections of the rods are shown in Fig. 7, and it will be understood that buttons may be made from the rods by machining and cutting transverse slices therefrom which have the desired thickness and thereafter drilling thread holes as may be necessary. Great savings in material are thus realized, since a minimum of waste material is removed in making each button.

The above description does not take into account supplementing the decorative effect produced by the addition of preformed pellets of casein, and this procedure will now be discussed.

The pellet feeding device 15 is of conventional design, and is operated by the main driving motor as described. Its function is to introduce at predetermined intervals a pellet of plastic substance into the screw chamber. When working with casein in the main hoppers, the pellets may be small cylinders molded from previously masticated and extruded casein.

The color of the added pellets may be the same as the color of the darker portion of granular casein fed from one of the hoppers 4 and 5. The pellets may also have the color of the lighter colored casein or may be of any other suitable color depending upon the color combination desired in the finished buttons. The use of these pellets adds extremely distinct and somewhat abbreviated sharp lines of color to the finished product, and these lines of color follow the general grain structure of the extruded rod.

When operating with colored and clear casein it is desirable that the color shall not bleed from the darker into the lighter portions of casein. We have found that by properly adjusting the moisture content of the two caseins such bleeding is minimized or entirely overcome. It is usual to adjust the moisture content of casein to be extruded to a value approximating 18 to 20% to permit easy working of the material in the extruding machine. To prevent bleeding, we prefer to increase the moisture content of the lighter fraction of casein one or two per cent, and in any event less than 10%, and to decrease the moisture content of the colored fraction by an amount such that the total moisture content of the extruded rod is approximately that required for best extruding conditions. A strict balance of moisture content is not an essential requirement in securing sharp separation of colors. The moisture content of the colored casein may be more or less than that necessary to balance the average moisture analysis of the extruded rod so long as good working conditions are maintained. It will be seen that this feature provides a moisture differential between the two fractions of casein such that the flow of moisture between the fractions is in a direction from the lighter or uncolored casein to the darker or colored casein. This flow tends to retain the coloring substance in the colored fraction and practically eliminates bleeding of coolor into the lighter fraction.

When colored pellets are used they preferably have a lower moisture analysis than the other fractions of casein to prevent bleeding.

Although the apparatus and the method of extruding grained rod is applicable to all extrudable plastic substances, it has been described principally with reference to casein. We have discovered that a more distinct mottling is obtained if the masses of granulated casein which are alternately fed to the machine have previously been worked, as by extruding or otherwise subjecting the casein to heat, pressure and elongation, and subsequently grinding to produce granulated casein. If this previously worked casein is fed to the apparatus of this invention, a more clear-cut and distinct pattern is obtained in the extruded rod.

This application is a continuation-in-part of our copending application Serial No. 309,490, filed December 15, 1939, for Variegated plastic articles which has become abandoned.

We claim:

1. The process of making variegated articles which comprises masticating successive discontinuous portions of differently colored plastic material, forcing said masticated portions into a continuously advancing stream comprising successive different colored portions extending transversely across substantially the entire stream, splitting said advancing stream substantially along the longitudinal axis thereof into a plurality of portions, and extruding said portions into separate articles.

2. The process of making variegated articles which comprises masticating successive discontinuous portions of differently colored plastic material, forcing said masticated portions into a continuously advancing stream comprising successive different colored portions extending transversely across substantially the entire stream, splitting said advancing stream substantially along the longitudinal axis thereof into two portions, and extruding said portions into separate rods.

3. Apparatus for making variegated extruded articles which comprises means defining a longitudinally extended conduit for the advancement of a stream of plastic material, means for introducing into said conduit a succession of different colored portions of plastic material extending substantially transversely and substantially entirely across said conduit, means for forcing said plastic material along said conduit, means for splitting the advancing stream of plastic material substantially along its longitudinal axis into a plurality of portions, and means for extruding said portions into separate articles.

4. Apparatus for making variegated extruded articles which comprises means defining a longitudinally extended conduit for the advancement of a stream of plastic material, means for introducing into said conduit a succession of different colored portions of plastic material extending substantially transversely and substantially entirely across said conduit, means for forcing said plastic material along said conduit, means for splitting the advancing stream of plastic material substantially along its longitudinal axis into two portions, and means for extruding said portions into separate rods.

5. Apparatus for making variegated extruded articles which comprises means providing a cylindrical masticating chamber, a masticating screw rotatably mounted within said chamber, said screw having a relatively blunt front end, the front end of said masticating chamber conforming to the front end of said screw and being spaced therefrom to provide a restricted, centrally converging passage, means for supplying successive discontinuous portions of differently colored plastic material to said masticating chamber, means defining an elongated conduit for the advancement of a stream of plastic material, centrally disposed restricted outlet means at the front end of said chamber opening into one end of said conduit, means positioned near the other end of said conduit for splitting a stream of plastic material advancing therethrough substantially along its longitudinal axis into a plurality of portions, and means for extruding said portions into separate articles.

6. Apparatus for making variegated extruded articles which comprises means providing a cylindrical masticating chamber, a masticating screw rotatably mounted within said chamber, said screw having a relatively blunt front end, the front end of said masticating chamber conforming to the front end of said screw and being spaced therefrom to provide a restricted, centrally converging passage, means for supplying successive discontinuous portions of differently colored plastic material to said masticating chamber, means defining an elongated conduit for the advancement of a stream of plastic material, centrally disposed restricted outlet means at the front end of said chamber opening into one end of said conduit, means positioned near the other end of said conduit for splitting a stream of plastic material advancing therethrough substantially along its longitudinal axis into two portions, and means for extruding said portions into separate rods.

7. The process of making buttons which comprises masticating successive discontinuous portions of differently colored plastic material, forcing said masticated portions into a continuously advancing stream comprising successive different colored portions extending transversely across substantially the entire stream, splitting said advancing stream substantially along the longitudinal axis thereof into two portions, extruding each of said portions into a separate cylindrical rod, and cutting buttons from said rods transversely thereof.

NEIL O. BRODERSON.
EDWIN C. BRODERSON.

REFERENCES CITED

The following references are of record in the file of this patent:

UNITED STATES PATENTS

| Number | Name | Date |
|---|---|---|
| 1,083,275 | Eberhard | Jan. 6, 1914 |
| 1,747,574 | Brock | Feb. 18, 1930 |
| 1,768,790 | Royle | July 1, 1930 |
| 1,783,287 | Hilgendorf | Dec. 2, 1930 |
| 2,022,895 | Morrell | Dec. 3, 1935 |
| 2,091,125 | Stewart | Aug. 24, 1937 |
| 2,171,095 | Orsini | Aug. 29, 1939 |